Sept. 17, 1963  B. MACK  3,104,129
MOLDED BICYCLE SEAT
Filed May 8, 1962

INVENTOR.
BERNARD MACK
BY
Bierman + Bierman
ATTORNEYS

United States Patent Office 3,104,129
Patented Sept. 17, 1963

3,104,129
MOLDED BICYCLE SEAT
Bernard Mack, 1100 Leggett Ave., New York 59, N.Y.
Filed May 8, 1962, Ser. No. 193,114
10 Claims. (Cl. 297—195)

The present invention is directed to seats, more particularly to saddles for bicycles, motorcycles and the like.

Usually, such saddles have been made with metal frames and the seat portion was of leather or the like attached to the metal frame. Coil springs, secured to the cycle and to the saddle, and associated with cooperating elements completed the structure. Such saddles had numerous parts and were relatively expensive to produce. In order to reduce the cost thereof, it was proposed to mold the saddle, but this still required a number of metal members to complete the structure; also metal parts were necessary to stiffen the molded portion. Coil springs were still needed, a metal frame was provided, and the fabrication thereof required considerable labor for assembling and completing the saddle.

The present invention is intended and adapted to overcome the difficulties and deficiencies inherent in prior structures of the above type, it being among the objects of the invention to provide a saddle-type structure which eliminates the necessity of coil or other springs and also reduces the number of elements.

It is also among the objects of the invention to provide a saddle which is molded of a suitable synthetic plastic material in a single operation to form a complete and self contained saddle which is attached directly to its support.

In practicing the invention, there is formed in the molding operation a unitary integral structure consisting of a seat, molded spring, and base. The unit is then attached to a metal part at the forward and rear portions, said part being directly attachable to the cycle. This attachment is simple, requiring only a minimum of labor and being highly effective as well as novel.

The invention is more fully described in connection with the accompanying drawing constituting a part hereof in which like reference characters indicate like parts, and in which—

Figure 1:
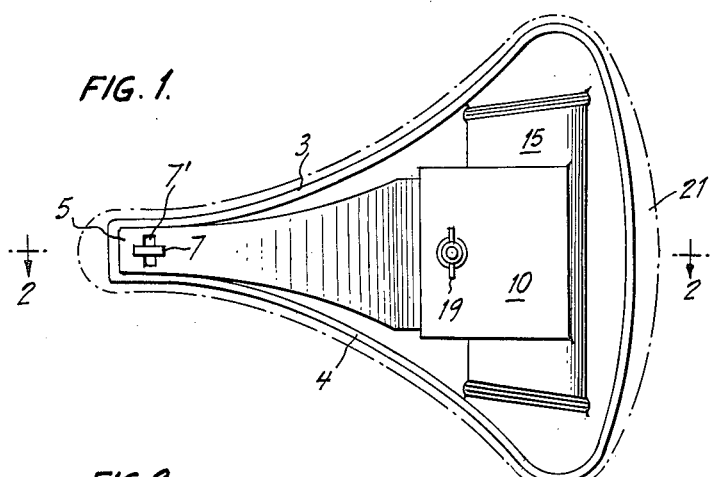
FIG. 1 is a bottom elevational view of a bicycle saddle made in accordance with the present invention.

Seat 1 of the saddle is substantially flat and has a depending flange 2. Sides 3 and 4 of the seat converge from the rear to the front 5 of the seat. Pin 6 depending from the underside of front 5 terminates in head 7, which is elongated.

At the rear 8 of the seat and depending from the under side thereof and integral therewith is an accordion spring 9 of said synthetic plastic material. Spring 9 terminates in a flat base 10 and it is provided with a lateral rib 11 on one or both edges. Depending sides 12 from base 10 are connected by horizontal member 13 forming channel 14. A central cutout portion 15 may be provided in spring 9 in case the synthetic material is sufficiently strong for the design load, in order to reduce the weight of the molded material.

Figure 2:
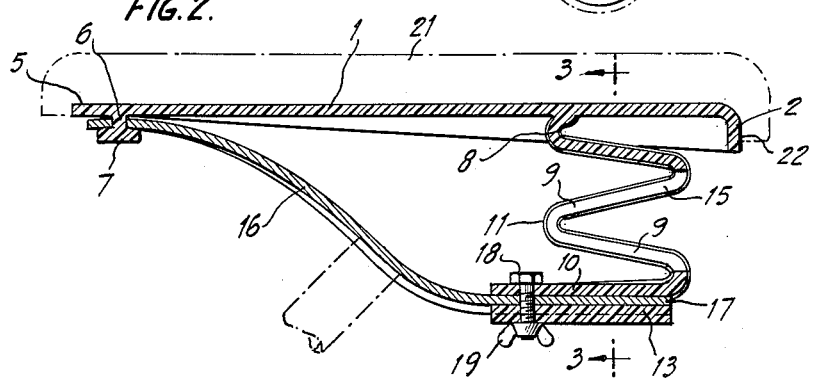
FIG. 2 is a longitudinal cross-sectional view taken along line 2—2 of FIG. 1.
Figure 3:
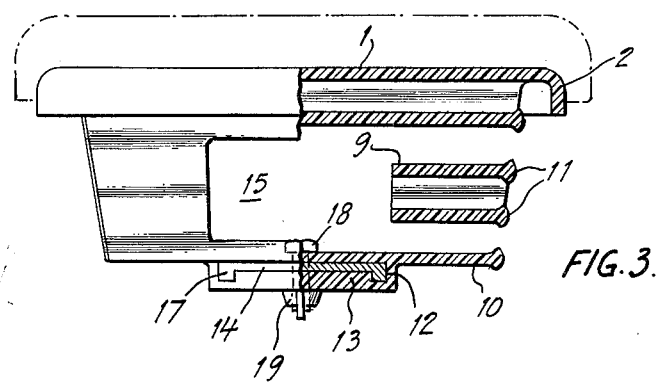
FIG. 3 is a transverse cross-sectional view thereof taken along line 3—3 of FIG. 2.

Support 16 of metal is attached to the cycle frame in any usual manner. Rear 17 of the support is slipped into channel 14, which may be provided with a stop at the rear to limit and define the position of rear 17. Slot 7' in the front of support 16 is transverse to the longitudinal axis of the saddle. Head 7 is parallel to the longitudinal axis of the saddle and is of such size as to be capable of passing through slot 7'. To interlock the slot and head, the latter is twisted by hand or otherwise until the slot will be alined with the head, and the support is pushed up until it alines with pin 6, after which head 7 is released. Because of the inherent resiliency of the molded material, the head will resume the position shown at the left of FIG. 2 and effectively lock the support into operative position.

In order to further assure locking of the support to the saddle, bolt 18 is passed through an opening in base 10, rear 17 of support 16 and member 13. Wing nut 19 on bolt 18 completes the locking. A cover 20 of any suitable material may cover seat 1 and have resilient padding 21 thereunder, and be attached to the edge of the seat as by the application of heat and pressure as shown at 22.

What is claimed is:
1. A bicycle saddle or the like comprising a seat, a sinuous spring extending down from the under side of said seat and terminating in a base, said seat, spring and base being integral, a support attached to the front of said seat and extending rearwardly and downwardly and secured to the lower end of said spring.
2. A saddle according to claim 1 wherein said seat and support are attached by a cooperating pin and slot.
3. A saddle according to claim 1 characterized in that said spring is W-shaped in cross-section when said saddle is viewed in upended position.
4. A saddle according to claim 1 characterized in that the attachment of said spring to said seat is in alinement with the base of said spring.
5. A saddle according to claim 1 characterized in that a rib is provided on the lateral edges of said spring.
6. A saddle according to claim 1 characterized in that said spring has a central opening.
7. A saddle according to claim 2 characterized in that said pin has a head entering said slot.
8. A saddle according to claim 7 characterized in that said slots and said head are elongated with the axes thereof at an angle to each other.
9. A saddle according to claim 1 characterized in that said base is provided with a channel into which said support is fitted.
10. A saddle according to claim 9 characterized in that means are provided for fitting said support in said channel.

References Cited in the file of this patent
UNITED STATES PATENTS

| | | |
|---|---|---|
| 460,279 | McGlinchey | Sept. 29, 1891 |
| 477,277 | Smith | June 21, 1892 |
| 479,656 | Peet | July 26, 1892 |
| 502,017 | Richmond | July 25, 1893 |
| 1,975,405 | Pryale | Oct. 2, 1934 |
| 2,980,162 | Bourgois | Apr. 18, 1961 |

FOREIGN PATENTS

| | | |
|---|---|---|
| 112,967 | Germany | Sept. 12, 1900 |